Dec. 10, 1968    A. L. DIEBOLD    3,415,303
PORTABLE PARTITION
Filed June 9, 1966
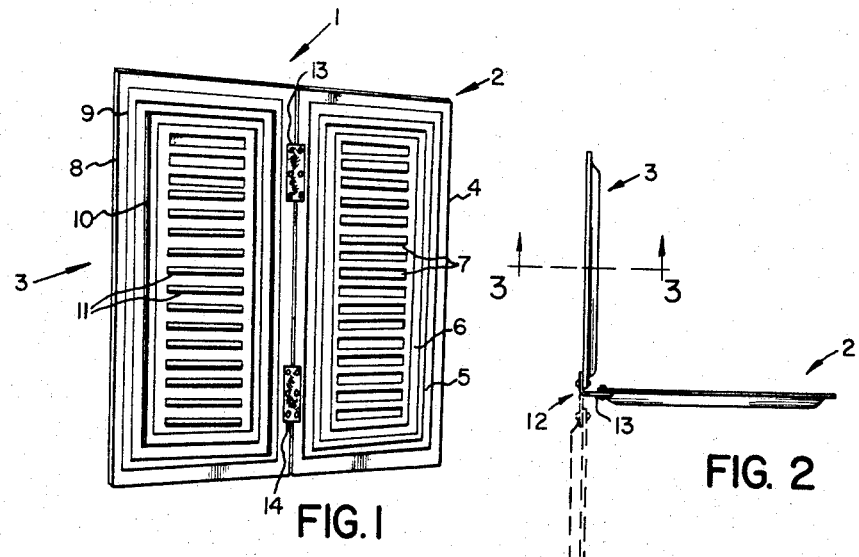
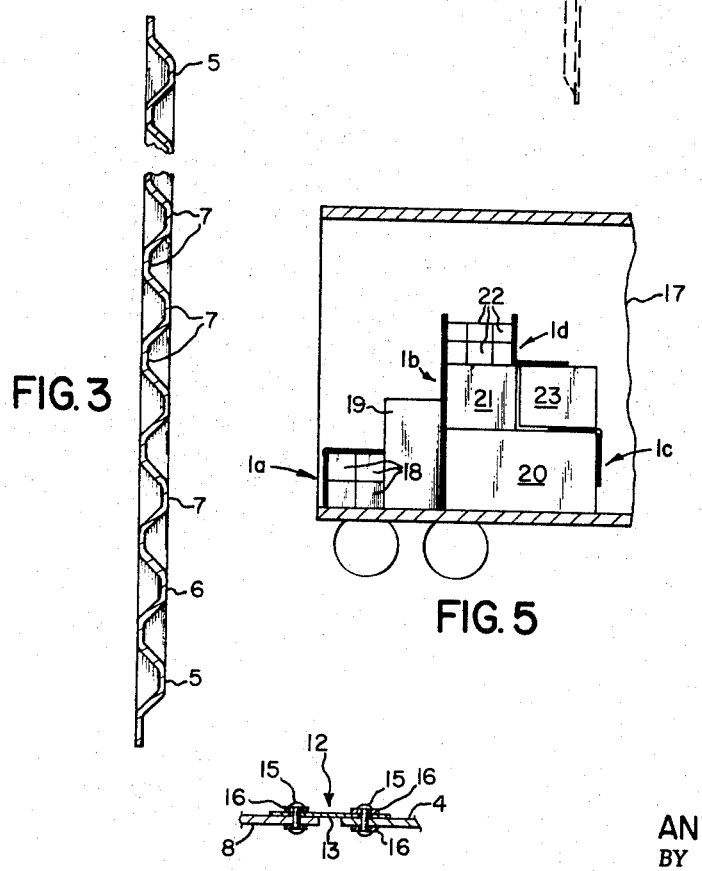
INVENTOR.
ANTHONY L. DIEBOLD
BY
Learman, Learman & McCulloch
ATTORNEYS United States Patent Office 3,415,303
Patented Dec. 10, 1968

3,415,303
PORTABLE PARTITION
Anthony L. Diebold, Saginaw, Mich., assignor to Great Lakes Express Co., Saginaw, Mich., a corporation of Michigan
Filed June 9, 1966, Ser. No. 556,411
3 Claims. (Cl. 160—229)

ABSTRACT OF THE DISCLOSURE

A portable partition comprising a pair of semirigid panel members each of which has a plurality of undulating ribs formed therein, the panel members being joined to one another by flexible hinges to enable either panel member to be swung through 360° relatively to the other. The panel members and their respective ribs are so oriented to one another that when either of the panels is swung to a position in which it overlies the other, the ribs of the respective panels nest.

---

This invention relates to a portable partition construction especially adapted for use in cargo carrying vehicles for the support, separation and protection of individual or groups of cartons, packages, or other types of materials to be transported.

In the transporting of goods by truck or rail, it is not uncommon for a single vehicle to contain a plurality of different types of goods destined for the same or different terminals. It frequently is desirable to separate individual or groups of goods from each other. The reasons for separation are numerous and include the division of goods destined for different terminals, protection of a stack of goods from collapse, and provision of a supporting surface between goods in the same stack so as to make better use of the capacity of the vehicle. Regardless of the reasons for which a divider or partition may be used, it is essential that the partition be sufficiently strong to accomplish the purpose for which it is intended and yet be sufficiently light in weight as to avoid materially reducing the payload of the vehicle. Moreover, the partition should be sufficiently light in weight as to be handled conveniently by one person and be capable of adapting itself to goods of different size and shape. Furthermore, such a partition should be capable of occupying as little storage space as possible when it is not in use.

An object of this invention is to provide a partition construction which possesses all of the desirable characteristics referred to above.

Another object of the invention is to provide a partition construction which is economical to produce, rugged in use, and light in weight.

A further object of the invention is to provide a partition of the character described which has a relatively high degree of flexibility or resilience and yet which is so constructed as to be self-supporting and capable of withstanding severe loads.

Other objects and advantages of the invention will be pointed out specifically or will become apparent from the following description when it is considered in conjunction with the appended claims and the accompanying drawing, in which:

FIGURE 1 is a perspective view of a partition constructed in accordance with the invention;

FIGURE 2 is an end elevational view of the partition and illustrating how the panels thereof are capable of relative adjustment;

FIGURE 3 is a fragmentary, enlarged, sectional view taken on the line 3—3 of FIGURE 2;

FIGURE 4 is an enlarged, fragmentary, sectional view through one of the hinges of the partition; and FIGURE 5 is a diagrammatic view of a trailer vehicle partially loaded with goods of different kinds and illustrating various positions in which the partition may be placed.

A partition constructed according to the invention is designated generally by the reference character 1 and comprises two similar panel members 2 and 3 of preferably rectangular configuration. The panels preferably are formed of a molded, flexible and resilient, but tough and durable plastic material, which may be polyethylene, polyvinylchloride, or the like. The panel 2 comprises a body 4 having integrally formed therein a pair of concentric, generally rectangular ribs 5 and 6 between which is a plurality of longitudinally spaced, parallel ribs 7, the arrangement being such that the panel body 4 thus is provided with a plurality of longitudinal and transverse ribs which lend substantial rigidity to the body but still permit it to be of such flexibility as to be capable of deflection under load, the inherent resilience of the material from which the body is made being such as to enable it to return to its normal, unstressed condition following removal of such load.

The panel 3 comprises a body member 8 formed of the same material as the member 4 and provided with undulating concentric, rectangular ribs 9 and 10 between which is a plurality of undulating transverse ribs 11 similar to the ribs 7.

The ribs of the panel 2 protrude from one side of the plane of its body and the ribs of the panel 3 also protrude from one side of the plane of its body. The left-hand side of the panel shown in FIGURE 3 may be considered the front face of the panel and the right-hand side may be considered the rear face. If the two panels are arranged in overlying relation with the rear face of the overlying panel confronting the front face of the other panel, the ribs of the two panels will nest. The arrangement is such that the two panels can be nested so as to minimize the space required for storage.

Means 12 is provided for hingedly connecting the panels 2 and 3 to one another and preferably comprises a pair of longitudinally spaced apart, woven canvas or other fabric hinge members 13 and 14. Rivets 15 or the like secure the hinge members to the respective panel members, washers 16 preferably being interposed between the rivet heads and the adjacent surfaces of the hinge members and the panel members so as to minimize the risk of tearing the respective members.

The width of each hinge members 13 and 14 should be such as to permit the confronting edges of the panel members 2 and 3 to be spaced apart from one another a distance sufficient to enable either panel member to be swung through substantially 360° relative to the other member. Thus, the panels 2 and 3 may be arranged in substantially the same plane and in prolongation of each other, as is shown in FIGURE 1, or at right angles to each other as is shown in full lines in FIGURE 2. Alternatively, the two panels may be so arranged as to overlie each other in face-to-face confrontation so as to provide a double thickness partition, if desired.

FIGURE 5 discloses a vehicle such as a truck containing several groups of different kinds of goods and illustrating partitions constructed in accordance with the invention positioned in such manner as to accomplish different objectives. Thus, a partition 1a may be used to overlie the rear and upper surfaces of a group of packages 18, a partition 1b may be located in an upright position so as to separate a large article 19 from stacked articles 20, 21 and 22, a partition 1c may overlie the front surface of the article 20 and the top surface of the latter so as to serve as a protective support for an article 23 supported on the article 20, and a partition 1d may be so arranged as to provide a front support for the articles 22 and a protective upper surface for the article 23. Although not shown in the drawings, it will be understood that rods or rails spanning the distance between the side walls of the vehicle or spanning the distance between the floor and the ceiling of the vehicle may be utilized, if desired, to hold the partition members in place.

The disclosed embodiment is representative of a presently preferred form of the invention, but is intended to be illustrative rather than definitive thereof. The invention is defined in the claims.

I claim:

1. Partition apparatus comprising first and second similar, spaced apart panel members, each of said panel members having undulating ribs formed therein said ribs of each of said members comprise a combination of longitudinal and transverse ribs; and flexible hinge means connecting said members to one another, the spacing between said members and the flexibility of said hinge means being such as to enable either of said members to swing relatively to the other of said members through substantially 360° so as to enable either one of said panel members to overlie the other, the arrangement of said panel members relative to one another being such that the ribs of the respective members may nest when either one of said panels overlies the other.

2. The apparatus set forth in claim 1 wherein each of said members is formed of resilient material having sufficient rigidity to be self-supporting.

3. The apparatus set forth in claim 1 wherein the ribs of each member are arranged to provide a plurality of concentric rectangles within which is a plurality of longitudinally spaced, tranverse ribs.

References Cited

UNITED STATES PATENTS

| 1,215,223 | 2/1917 | Vanderpoel | 160—231 |
| 1,370,324 | 3/1921 | Lafuente | 160—219 X |
| 2,842,776 | 7/1958 | Zakin | 160—229 |
| 3,246,746 | 4/1966 | Holley | 206—65 |

PETER M. CAUN, *Primary Examiner.*